Patented Feb. 8, 1944

2,341,289

UNITED STATES PATENT OFFICE 2,341,289

RUBBER COMPOSITION

Philip A. Ray, Wilmington, Del., assignor to Hercules Powder Company, Wilmington, Del., a corporation of Delaware No Drawing. Application October 31, 1940, Serial No. 363,700

6 Claims. (Cl. 260—755)

This invention relates to a composition of matter containing rubber and a new softener therefor, and to the method of making the same.

It is an object of the present invention to provide a new softener for rubber. Another object is to provide a composition of matter containing rubber and the new softener. Another object is to provide an improved process of softening rubber. Another object is to provide an improved process of compounding a rubber mix. Yet another object is to provide an improved process of reclaiming rubber. Still other objects will more fully hereinafter appear.

I have found that rubber may be advantageously softened by a tar comprising a blend of the residue of the destructive distillation of a pine wood resin which contains at least about 15%, and preferably at least about 35%, of gasoline-insoluble resinous material, and of an oily material miscible therewith, preferably the oily portion of the residue formed by the distillation.

The rubber to be softened in accordance with the present invention may be either raw or vulcanized, fresh or reclaimed. The softening may be effected during preparation of the conventional rubber mix by employing the softener of the present invention in place of the conventional softeners heretofore employed. Alternatively, rubber may be softened with the softener of the present invention in advance of the preparation of the rubber mix. In accordance with another embodiment, softening may be carried out during the reclaiming operation using a conventional reclaiming process in which the softener commonly used has been replaced by the softener of the present invention.

The softener employed comprises a tar prepared by a process set forth in detail in my copending application, Serial No. 360,263, filed October 8, 1940, which issued as Patent No. 2,273,725. This process comprises essentially the destructive distillation of a pine wood resin which comprises at least about 15%, and preferably at least about 35% up to about 100%, of gasoline-insoluble resinous material and blending the distillation residue with an oily medium miscible therewith which preferably constitutes the oily portion of the distillate formed during the distillation. If desired, the oily medium blended with the distillation residue may comprise the oily portion of the distillate obtained by the destructive distillation of a different pine wood resin containing at least about 15%, and preferably at least about 35%, of gasoline-insoluble resinous material. The resinous raw material is characterized by being almost completely soluble in such solvents as benzene, toluene, xylene, etc. The distillation residue formed in a given run may be blended with the oily portion of the distillate formed during the run and with additional oil formed in another run to give a tar of the desired viscosity. Preferably, the oily blending medium is substantially water-free.

The total resinous extract of pine wood, such as is obtained by extracting pine wood with benzene, comprises pale rosin, gasoline-insoluble resinous material, and color bodies. Upon the treatment of such resinous extract to separate therefrom a fraction of pale rosin there is formed one or more fractions containing the balance of the resinous material derived from the pine wood. One or more of such fractions may be employed as the raw material for the manufacture of the tar. The non-rosin portion of the pine wood extract may be separated by appropriate processes into a fraction of substantially gasoline-insoluble resinous material and a dark-colored intermediate fraction lying between the gasoline-insoluble fraction and the pale rosin. It is impossible to effect an absolutely clean separation between the gasoline-insoluble resinous material and the rosin. By the preparation of a dark-colored intermediate fraction containing some gasoline-insoluble resinous material and the color bodies which would otherwise go into the rosin, a fairly good separation of the pine wood extract into pale rosin, gasoline-insoluble resinous material, and into this intermediate fraction is effected.

Thus, there may be used as the resinous raw material for the manufacture of the tar a resinous material obtained from pine wood and containing from about 15% to about 35% of gasoline-insoluble resinous material, or the dark-colored intermediate fraction largely insoluble in petroleum hydrocarbons and obtained by the refining of impure wood rosin to pale grades by means of a selective solvent for color bodies such as furfural, or a selective adsorbent such as fullers' earth, or the substantially completely gasoline-insoluble resinous material obtained from pine wood, mixtures of the foregoing fractions, or equivalent resinous materials. As an example of a mixture, there may be used a blend of the dark-colored intermediate fraction and the substantially gasoline-insoluble fraction, obtained for example from pine wood without separation into the individual fractions, either by a process which involves leaving the rosin in the wood or by a process which involves separation of the rosin from such a mixture. Preferably the resinous raw material contains at least about 35% of gasoline-insoluble resinous material, varying therefrom up to about 100%. In view of its availability, it is preferred to use the dark-colored intermediate fraction containing from about 35% up to about 75% of gasoline-insoluble resinous material, the tar prepared therefrom having been found to be an excellent rubber softener.

The dark-colored intermediate fraction referred to above is a product resulting from the process used in decolorizing rosin. For example, so-called FF rosin, which is ruby red in color and may be derived from pine wood by extracting with benzene followed by evaporation of the benzene and extraction of the resinous residue with petroleum hydrocarbon such as hot petroleum ether or hot gasoline, is decolorized by adding furfural to the hot solution, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural. The residue remaining is the dark-colored intermediate fraction referred to. This fraction contains most of the unsaponifiables and coloring bodies from the original FF rosin as well as a good proportion of the rosin acids. It contains a large proportion of oxidized rosin acids and therefore is only partially soluble in petroleum hydrocarbon solvents at room temperature. The percentage of gasoline-insolubles varies from about 35% to about 75% by weight. It has a higher flow point, a much higher viscosity, lower acid number, and higher unsaponifiable content than FF wood rosin. However, the saponification number is not correspondingly lower indicating a high ester content. In addition, the fraction is non-crystallizing. Such a fraction is characterized by the following approximate analysis:

| | |
|---|---|
| Unsaponifiables per cent | 10- 20 |
| Gasoline insolubles do | 35- 75 |
| Acid number | 100-130 |
| Saponification number | 140-150 |
| Melting point (drop) degrees C | 85- 95 |

A typical example of such a fraction had the following analysis: acid number, 124; saponification number, 150; melting point (drop), 89° C.; gasoline insolubles, 57%; unsaponifiable matter, 12%; Lovibond color, dark; ash content, 0.03%.

The substantially gasoline-insoluble fraction referred to above may be prepared from pine wood by the process set forth in U. S. patent to Hall, No. 2,193,026 or by the process described in U. S. patent to Hall, No. 2,221,540. This fraction is characterized by being substantially completely insoluble in petroleum hydrocarbons and particularly in gasoline. The gasoline-soluble portion of this fraction rarely exceeds 15% by weight. This fraction may be said to be the gasoline-insoluble resin contained in pine wood. For example, the extraction of pine wood with benzene yields a mixture of this fraction and FF rosin. Upon commingling the molten resinous mixture with a mixture of gasoline and a relatively small volume of furfural, the fraction in question goes into solution in the furfural. The two layers are allowed to separate and the resinous materials may then be recovered from the respective layers in any suitable manner.

The substantially gasoline-insoluble fraction is in general characterized by a methoxy content of from about 3% to about 7.5%, an acid number of from about 90 to about 110, a melting point (drop method) of from about 95° C. to about 125° C., petroleum ether or gasoline insolubility of at least about 85%, and a saponification number of from about 135 to about 145. A typical specimen had the following characteristics: Drop melting point, 115° C.; acid number, 93; gasoline-soluble matter, 12%; toluene insoluble matter, 20%; saponification number, 140; ash content, 0.02%.

In general, the resinous raw material employed in manufacturing the tar used in the present invention, and which is typified by the dark-colored fraction, the substantially completely gasoline-insoluble fraction, or blends thereof, may be defined as a resin naturally occurring in pine wood and characterized by a gasoline-insolubility of 15% or more, and preferably 35% or more, unsaponifiable content of from about 5% to about 20%, melting point at least about 85° C. and preferably at least 90° C., and an acid number of not over about 140.

The resinous raw material is destructively distilled preferably in an inert atmosphere such as carbon dioxide and in either the presence or absence of a decarboxylating catalyst such as p-toluene sulfonic acid, fuller's earth, zinc chloride, phosphoric acid, benzene sulfonic acid, phosphorous pentoxide, sodium acid sulfate, etc. The temperature of distillation is sufficient to effect formation of a resinous oil by decomposition of the resin and sufficient to form a residual pitch if the entire distillate were removed during the distillation. Temperatures ranging from about 300° C. to about 400° C. are operable, the preferred temperature range covering from about 330° C. to about 375° C. and still more preferably from about 355° C. to about 370° C. In general, the time may range from about 30 minutes to about 25 hours depending upon the temperature and pressure maintained, size of charge, presence or absence of decarboxylating catalyst, etc., the distillation being continued until the resin has been sufficiently decomposed. The distillation may be effected either by superheated steam, direct fire under the still, or preferably both. The distillation may be conducted under atmospheric, subatmospheric, or superatmospheric pressure.

The distillate comprises an oily material and a substantial amount of water. In addition appreciable amounts of non-condensable gases and "spirits" or low boiling material are formed and come over during the distillation. The oily portion of the distillate, namely that portion which boils above 100° C. and which is insoluble in water, is blended with the residue in order to yield a tar of the desired viscosity. This blending back may be accomplished in the following ways, among others:

(1) The entire distillate is removed during the distillation, condensed and collected, after which the aqueous layer is separated from the oily layer, the oily layer completely dehydrated if desired, as for example, by heat or by suitable chemical treatment and added to the residual pitch which has, following distillation, been allowed to cool down to from about 100° C. to about 250° C., with stirring until a uniform tar is obtained.

(2) The distillation is conducted at atmospheric pressure and the water-free oily portion of the distillate is refluxed continuously during distillation, using any suitable means which permits the water, "spirits," and non-condensable gases to pass over and which refluxes only absolutely dry oil.

(3) The distillation is conducted under superatmospheric pressure sufficient to maintain the temperature of the charge at the desired level and to increase the rate of decomposition of the charge, the water-free oily portion of the distillate being refluxed continuously throughout the distillation. Refluxing is conducted in such manner that water and "spirits" are not refluxed.

(4) The resinous raw material is heated in a closed vessel, pressure being allowed to build up as decomposition takes place, after which the reaction mixture is distilled to remove the water and "spirits" leaving the blend of pitch and oils behind.

If desired, additional resin oil of the type produced during the distillation or of a similar type, in excess of that derived from a given run, may be blended with the distillation residue or with the resulting tar. Alternatively, the oil from one run may be blended with pitch from another run.

Instead of blending the pitch with an oil derived by destructive distillation of a pine wood resin identical with that undergoing distillation, it may be blended with an oil derived by destructive distillation of another pine wood resin containing at least 15%, and preferably at least 35%, of gasoline-insoluble resinous material. For example, the pitch from the dark-colored intermediate fraction may be blended with the oil derived from the substantially gasoline-insoluble fraction, the pitch from the substantially gasoline-insoluble fraction may be blended with the oil derived from the dark-colored intermediate fraction, etc.

While it is preferred to blend the distillation residue or pitch with resin oil derived by the destructive distillation of a pine wood resin containing at least 35% of gasoline-insoluble resinous material, less advantageously this type of blending oil may be replaced partially or completely with other resin oils miscible with the distillation residue and obtained by destructive distillation of a pine wood resin such as rosin oil obtained from rosin, or, still less preferably, of other natural resins, such as copal resin oil, dammar resin oil, pontianak resin oil, kauri resin oil, etc.

The relative proportions of distillation residue and oil entering into the tar will depend largely upon the viscosity desired. The proportion of the resin oil blended with the pitch may vary within wide limits, for example within the range of from about 10% to about 1000% by weight based on the weight of the pitch. Excellent results have been obtained by blending the oily portion of the distillate from a charge of resin with the pitch formed in the run, up to a tar formed by blending such a tar with additional resin oil of the same or similar type in the proportions by weight of 20% of such a tar and 80% of resin oil.

The tars prepared in accordance with the foregoing are characterized in general by complete freedom from acetic acids or other volatile or unstable organic acids which are deemed objectionable in rubber softeners, a very substantial content of phenolic bodies, saponification number below 100 and usually below 60, acid number from about 30 to about 50, unsaponifiable content of at least about 50%, a methoxy content of from about 1% up to about 6%, substantially complete solubility in benzene, presence of not more than a trace of water or other moisture, and capability of being heated to at least about 350° C. without charring or other fundamental decomposition.

Rubber may be softened with the softener in accordance with the present invention in any desired manner, the softener being incorporated in the rubber either in advance, during rubber compounding, or during the reclaiming process. For example, the softener may be blended with the rubber by mastication therewith on the usual rubber mill or in a Banbury or Werner-Pfleiderer mixer, or the like. The softener may be incorporated during the compounding of a rubber mix in which the conventional additional ingredients are incorporated such as fillers, reinforcing agents, pigments, dyes, resins, accelerators, vulcanizers, etc.

The tar softener may advantageously be incorporated with the rubber during the reclaiming process in which scrap rubber is treated to recover the rubber portion thereof. Any of the conventional reclaiming processes may be employed. For example, the reclaiming may be carried out by heating the finely divided scrap under pressure in the presence of the softener after which the mixture is cooled and sheeted. The reclaiming may likewise be carried out by the acid or alkali process in which the scrap is heated under pressure with an aqueous acid or an aqueous alkali. In such case, the softener is added to the mixture of scrap and aqueous liquid prior to the subjection thereof to heat and pressure. A preferred reclaiming procedure comprises heating the scrap under pressure of from about 125 to about 250 pounds per square inch for a period of time of from about 8 hours to about 20 hours in the presence of the tar softener and an aqueous sodium hydroxide solution of a concentration ranging from about 4% to about 10% by weight, the amount of sodium hydroxide ranging from about 1% to about 20% by weight based on the weight of scrap. The amount of tar softener so employed may range from about 1% to about 20% by weight based on the weight of rubber in the scrap rubber. A preferred proportion is about 5% by weight.

The percentage of softener incorporated with rubber in accordance with the present invention may vary within wide limits depending upon the type of rubber, nature and amount of other ingredients, physical properties desired in the product, etc., but in general may range from about 1% to about 20% by weight based on the weight of rubber with which it is incorporated. A preferred proportion is about 5% by weight.

Below are given several specific examples in accordance with the present invention. The tar employed in the Examples 1 to 4 was prepared by destructively distilling at a temperature of about 360° C. for 4½ hours a charge of a dark-colored intermediate pine wood resinous fraction having a gasoline insolubility of 53–55%. Following the distillation, the oily portion of the condensate was freed from water and blended with the residual pitch in the still which had been allowed to cool down to below 250° C.

*Example 1*

|  | Parts by weight |
|---|---|
| Smoked sheets | 100 |
| Channel black | 50 |
| Sulfur | 2.8 |
| Mercaptobenzothiazole | 1 |
| Zinc oxide | 5 |
| Tar prepared from pine resin high in gasoline insolubles | 5 |
| Phenyl B-naphthylamine | 0.5 |

These components were mixed on a rubber roll mill in the conventional manner, the rubber being first broken down on the mill for 3 minutes after which the accelerator was added and mixed for 1.5 minutes after which the tar softener was added and mixed for 3 minutes whereupon the pigment and filler were added and mixed for 6 minutes after which the batch was mixed for 3 to 5 minutes.

Example 2

The same formulation and method as in Example 1 were employed except that in place of the tar there was substituted a softener comprising a blend of 75% of the tar and 25% of resin oil substantially identical with the resin oil formed during the destructive distillation procedure by which the tar was made.

Example 3

A typical alkali reclaiming procedure employing the softener of the present invention was as follows: There was placed in an autoclave the following mixture:

Scrap rubber (ground tires)_____pounds__ 4500
NaOH solution (5.0%)_____gallons__ 1700
Tar (same as in Example 1)_____do___ 28

This mixture was cooked for 12 hours at 200 lbs. pressure after which the mixture was allowed to cool, the reclaimed rubber washed with water to remove the alkali, dewatered, dried, and sheeted in the usual manner. The reclaimed rubber had an excellent tensile strength and displayed superior properties in general.

Example 4

| | Parts by weight |
|---|---|
| Crepe rubber | 100 |
| Tar (same as in Example 1) | 5 |

These materials were milled together on a roll mill until a uniform mixture was obtained. The product was an excellent rubber base for the manufacture of rubber goods by the addition of the conventional fillers, pigments, reinforcing agents, vulcanizing ingredients, vulcanization accelerators, and anti-oxidants.

Example 5

A mixture of 450 parts by weight of dark-colored intermediate pine wood resinous fraction (gasoline-insoluble 57%), 150 parts by weight of substantially completely gasoline-insoluble pine wood resin (gasoline-insoluble 88%), and 0.6 part by weight of p-toluene sulfonic acid was charged into a still and heated at 340–360° C. in an atmosphere of $CO_2$ for ¾ hour. The oils and water which distilled off were condensed and separated. When the residue had cooled to 180° C., the water-free oils were added, the mixture stirred and allowed to cool, thereby yielding a black viscous tar. This tar was used as a rubber softener in the proportion by weight of 5% based on the weight of rubber, with very satisfactory results.

Examples 6 to 9

The tar of Example 1 was blended with additional resin oil obtained by the destructive distillation of the same resin in the same manner, in the following proportions by weight.

| Example | Tar | Resin oil |
|---|---|---|
| | Per cent | Per cent |
| 6 | 80 | 20 |
| 7 | 60 | 40 |
| 8 | 40 | 60 |
| 9 | 20 | 80 |

Each of the resulting tars of varying viscosities was employed in rubber reclaiming in the same manner as in Example 3.

Example 10

A mixture of 600 parts by weight of substantially gasoline-insoluble pine wood resin (gasoline-insoluble 92%) and 0.6 part by weight of p-toluene sulfonic acid was heated at 340–360° C. in an atmosphere of $CO_2$ for ¾ hour. The oils and water which distilled off were collected and separated. When the residue in the still had cooled to 200° C., the water-free oils were added and stirred. The resulting viscous tar was incorporated with unvulcanized crepe rubber on a roll mill in the proportions of 5% by weight based on the rubber.

Example 11

A lot of substantially gasoline-insoluble pine wood resin (gasoline-insoluble 90%) was destructively distilled by heating on a sand bath at atmospheric pressure to about 380° C. and maintained at this temperature until the evolution of distillate ceased. The water-free oils were added to the residual pitch after it had cooled to about 200° C., and stirred to yield a tar. This tar was admixed with smoked rubber sheets in a Banbury mixer in the proportion of 10% by weight based on the weight of rubber.

Rubber softened in accordance with the principles of the present invention exhibits superior properties and is generally useful wherever softened rubber has been heretofore employed. The reclaiming of rubber when employing the softener in the present invention proceeds more satisfactorily and yields a reclaim of superior aging properties and better adapted as a component of new rubber mixes. The compounding of rubber masses employing the softener of the present invention entails smaller horse power requirements thus effecting an economy in manufacture, and in addition produces a compounded rubber of improved aging properties, tensile strength, etc.

It will be understood that the details and examples hereinbefore set forth are illustrative only and that the invention as broadly described and claimed is in no way limited thereby.

What I claim and desire to protect by Letters Patent is:

1. A rubber composition comprising rubber and a tar consisting of a blend of the residue and the resin oil obtained by destructively distilling a dark-colored pine wood resinous fraction containing from about 35% to about 75% of gasoline-insoluble material, said residue being the distillation residue obtained by heating said fraction at a temperature from about 330° C. to about 375° C. in an inert atmosphere and said resin oil being the oily portion of the distillate separated from the aqueous portion and dehydrated by heating.

2. A rubber composition comprising raw rubber and a tar consisting of a blend of the residue and the resin oil obtained by destructively distilling a dark-colored pine wood resinous fraction containing from about 35% to about 75% of gasoline-insoluble material, said residue being the distillation residue obtained by heating said fraction at a temperature from about 330° to about 375° C. in an inert atmosphere and said resin oil being the oily portion of the distillate separated from the aqueous portion and dehydrated by heating.

3. A rubber composition comprising reclaimed rubber and a tar consisting of a blend of the residue and the resin oil obtained by destructively distillating a dark-colored pine wood resinous fraction containing from about 35% to about 75% of gasoline-insoluble material, said residue being the distillation residue obtained by heating said fraction at a temperature from about 330° C. to about 375° C. in an inert atmosphere and said resin oil being the oily portion of the distillate separated from the aqueous portion and dehydrated by heating.

4. The rubber composition of claim 1, in which the tar is present in an amount from about 1% to about 10% by weight based on the weight of rubber.

5. The rubber composition of claim 2, in which the tar is present in an amount from about 1% to about 10% by weight based on the weight of raw rubber.

6. The rubber composition of claim 3, in which the tar is present in an amount from about 1% to about 10% by weight based on the weight of reclaimed rubber.

PHILIP A. RAY.